United States Patent
Bakhir

(10) Patent No.: US 11,306,402 B2
(45) Date of Patent: Apr. 19, 2022

(54) DEVICE FOR OBTAINING ELECTROLYSIS PRODUCTS FROM AN ALKALI METAL CHLORIDE SOLUTION

(71) Applicant: BLUE SAFETY GMBH, Münster (DE)

(72) Inventor: Vitold Bakhir, Moscow (RU)

(73) Assignee: BLUE SAFETY GMBH, Münster (DE)

(*) Notice: Subject to any disclaimer, the term of this patent is extended or adjusted under 35 U.S.C. 154(b) by 163 days.

(21) Appl. No.: 16/641,785

(22) PCT Filed: Aug. 24, 2018

(86) PCT No.: PCT/EP2018/072925
§ 371 (c)(1),
(2) Date: Feb. 25, 2020

(87) PCT Pub. No.: WO2019/038440
PCT Pub. Date: Feb. 28, 2019

(65) Prior Publication Data
US 2020/0248320 A1 Aug. 6, 2020

(30) Foreign Application Priority Data
Aug. 25, 2017 (DE) ...................... 10 2017 119 566.1

(51) Int. Cl.
*C25B 1/46* (2006.01)
*C02F 1/461* (2006.01)
(Continued)

(52) U.S. Cl.
CPC .............. *C25B 1/46* (2013.01); *C02F 1/4674* (2013.01); *C02F 1/46104* (2013.01); *C25B 9/19* (2021.01);
(Continued)

(58) Field of Classification Search
CPC .......... C25B 15/085; C25B 15/08; C25B 1/04
See application file for complete search history.

(56) References Cited

U.S. PATENT DOCUMENTS 7,897,023 B2    3/2011  Bakir et al.
2003/0196893 A1* 10/2003 McElroy ................... C25B 9/73
                                                204/266
(Continued)

FOREIGN PATENT DOCUMENTS

DE    10 2015 003911 A1    9/2016
EP    2 330 081 A2    6/2011
(Continued)

OTHER PUBLICATIONS

International Search Report dated Dec. 11, 2018, and issued in connection with PCT International Application No. PCT/EP2018/072925.
(Continued)

*Primary Examiner* — Harry D Wilkins, III
(74) *Attorney, Agent, or Firm* — Norris McLauglin, P.A.

(57) ABSTRACT

Device for obtaining electrolysis products from an alkali metal chloride solution where a cathode circuit contains a circulation pump with an overflow device for the return flow of pump liquid, which continuously secures the forced circulation of the catholyte via a heat exchanger, a cathode compartment and a capacitive separator for separating the hydrogen from the catholyte. In the discharge of the hydrogen from the capacitive separator for separation of the hydrogen from the catholyte, a cooled humidity separator is installed, the condensate collection container of which is connected via a dosage pump with the freshwater feed to the mixing device of the freshwater flow with the gaseous oxidant mixture.

2 Claims, 2 Drawing Sheets

(51) Int. Cl.
*C02F 1/467* (2006.01)
*C25B 15/08* (2006.01)
*C25B 9/19* (2021.01)

(52) U.S. Cl.
CPC .... *C25B 15/08* (2013.01); *C02F 2001/46171* (2013.01); *C02F 2201/4618* (2013.01); *C02F 2201/46115* (2013.01); *C02F 2201/46155* (2013.01)

(56) References Cited

U.S. PATENT DOCUMENTS

| | | | | |
|---|---|---|---|---|
| 2007/0261954 | A1* | 11/2007 | Bakhir | C02F 1/4674 204/260 |
| 2014/0013580 | A1 | 1/2014 | Limback et al. | |
| 2014/0367247 | A1* | 12/2014 | Croke | C25B 13/04 204/229.8 |
| 2016/0108528 | A1* | 4/2016 | Lin | A61M 16/101 204/276 |

FOREIGN PATENT DOCUMENTS

| | | | | |
|---|---|---|---|---|
| GB | 2479286 B | | 9/2013 | |
| RU | 2 148 027 C1 | | 4/2000 | |
| RU | 2326054 C1 | * | 6/2008 | ............. C02F 1/467 |
| RU | 2459768 C1 | * | 8/2012 | ............. C02F 1/467 |
| WO | WO 2010/012792 A2 | * | 2/2010 | ............. C02F 1/461 |
| WO | WO 2012/041357 A1 | * | 4/2012 | ............. C02F 1/4674 |

OTHER PUBLICATIONS

English Translation of International Search Report dated Dec. 11, 2018, and issued in connection with PCT International Application No. PCT/EP2018/072925.

Written Opinion issued in connection with International Application No. PCT/EP2018/072925.

* cited by examiner

DEVICE FOR OBTAINING ELECTROLYSIS PRODUCTS FROM AN ALKALI METAL CHLORIDE SOLUTION

This application is the U.S. National Stage of International Application No. PCT/EP2018/072925, filed Aug. 24, 2018, which claims foreign priority benefit under 35 U.S.C. § 119 of German Application No. 102017119566.1, filed Aug. 25, 2017.

FIELD OF THE INVENTION

The invention refers to the field of chemical technology and relates in particular to a device for the electrolysis of aqueous alkali metal chloride solutions in order to produce chlorine, chlorine compounds, oxygen, ozone, and hydroperoxide compounds and can be used in medicine, the food industry, and in the treatment (purification) and sterilization of water.

DISCUSSION OF THE PRIOR ART

Methods for producing disinfectant solutions are known based on products from the anodization of alkali metal chloride solutions through the treatment of the initial solutions in the anode compartment of electrolysis machines operating using the diaphragm method, using different hydraulic diagrams into which these electrolysis machines are integrated.

Accordingly, in RU 2148027 C1, a production method for the disinfectant is disclosed, and a device for its production is described. The invention describes the preparation of the initial solution by mixing drinking water with alkali chemical chloride solution and the systematic treatment (processing) of the initial solution obtained in the anode compartment of the main electrolysis machine driven using the diaphragm method, and subsequently in the anode compartment of the ancillary electrolysis machine driven using the diaphragm method. Here, the cathode compartments of both electrolysis machines are connected with an auxiliary electrolyte container (catholyte container) and due to the convection and gas-lift current in the electrode compartments of the electrolysis machine, operate in a circulatory manner. The parameters of the disinfectant solution to be produced are regulated by mixing the initial solution with the catholyte from the circuit, which is the same for the main and ancillary electrolysis machine. The introduction of the alkaline catholyte into the initial solution makes it possible to control the pH value of the end product, the disinfectant. The differential pressure on the ceramic ultrafiltration diaphragm in the range of 0.1 to 1.4 kgs/cm$^2$ of the ancillary electrolysis machine creates a differential pressure in the pore space of the diaphragm, which secures an ion-selective (ion-sensitive) charge transfer through the cations (sodium ions) from the anode compartment into the cathode compartment. The ceramic ultrafiltration diaphragm becomes an efficient, ion-selective separation wall (here a cation-active membrane) during operation in the electrical field in superposition with the filtration field, which is specified by the differential pressure. The present technical solution makes it possible to produce solutions with low corrosiveness through the maintenance of the pH value of the target solution in the neutral range. One disadvantage of this technical solution is that in the target product (disinfectant solution), alongside the degradation products in the anode compartment, accompanying substances (sodium chloride) are created in approximately the same quantity as a result of the method of continuous liquid conversion of the initial substances in the process chain of the device.

One disadvantage of the known solution is also that it is difficult to stabilize the operating parameters of the system, which spontaneously change during the course of time, particularly if the mineral content fluctuates as a result of changes to the chemical composition of the drinking water. The presence of a shared catholyte circulation vessel for the main and ancillary electrolysis machine requires a great deal of time for the stabilization of the operation of the system each time it is switched on or if changes are made to the mode of operation of the system (change to the current strength, the flow rate), during the course of which an uncontrolled migration of the bivalent cations of the metals from the cathode compartments into the anode compartments occurs. This phenomenon reduces the duration of the maintenance of the sporicidal activity of the disinfectant obtained, since the presence of bivalent metal ions in the oxidant solution accelerates the disintegration (chemical decomposition 9 of the hypochlorous acid. Even when the electrochemical system is at a standstill, cation hydroxides of the polyvalent metals are deposited in the pores of the diaphragm with mutual, trans-membrane influencing of the concentrated lye (catholyte) with the diluted electrolyte in the anode compartment (anolyte). This phenomenon also leads to an impairment of the operating parameters of the system during the course of time and to a necessary periodic purification of the cathode compartments of the electrochemical reactors with acid solution.

Technically, and in terms of the result to be achieved, the device from U.S. Pat. No. 7,897,023 B2, which has been selected as a prototype, comes closest to the claimed device. The above device contains an electrochemical reactor, which is represented by one or more modular electrochemical elements (cells), which are connected hydraulically in parallel, the anode and cathode compartment of the reactor is separated by a tubular, porous, ceramic separation wall, which is disposed coaxially between the electrodes of the cells, the entrance to the anode compartment is connected with the device for feeding the saline solution under pressure, the exit is connected with the device for stabilizing the specified overpressure in the anode compartment. The device has a catholyte circuit, which includes the cathode compartment of the electrochemical reactor, a capacitive (volume) separator for separating the hydrogen from the catholyte, a facility for draining the excess catholyte from the circuit, a heat exchanger for cooling the circulating catholyte, and a device for mixing the gaseous products of the electrochemical anodic reactions with the freshwater flow. The above device can also include a dosing apparatus for feeding the catholyte to the oxidant solution for the purpose of regulating the pH value.

The disadvantages of this device lie in the considerable inequality between the local values for the current density in relation to the level of the electromagnetic reactor due to the low speed of the convection and gas-lift circulation of the catholyte in the electrode compartments of the reactor cells. In the lower part of the reactor, where the quantity of the hydrogen that separates is relatively low, the current density is multiple times higher than in the upper part of the electrode compartment, where the separating hydrogen forms a considerable flow resistance of the electric current. This phenomenon limits the permissible current load for the reactor, as a result of which it has to be operated with a reduced capacity. Due to the enlargement of the electrical resistance in the upper part of the reactor, the electrolyte in the lower part of the cathode compartment becomes overheated and as a result, the initial saline solution is heated, which enters the lower part of the anode compartments of the reactor as a result of heat transfer through the ceramic diaphragm. With the electrolysis, this leads to an increased formation of chlorates, which cause damage to the end product. If the device is operated intermittently, there is an interaction between the catholyte, which is represented by a concentrated sodium hydroxide solution, and the electrolytes in the anode compartment. As a result, insoluble hydroxides of polyvalent metals form in the pore space of the diaphragm, and the pores in the diaphragms of the reactor become clogged.

SUMMARY OF THE INVENTION

One goal of the invention is to increase the reactor capacity while at the same time improving the quality of the end product, the disinfectant solution of the oxidants, by reducing the content of ancillary components in the form of chloride ions, chlorates and alkali metal cations.

The technical result of the invention is achieved due to the fact that unlike the known technical solution, the catholyte circuit contains a circulation pump with an overflow device for the return flow of the pump liquid, which continuously secures the forced circulation of the catholyte via the heat exchanger, the cathode compartment and the capacitive (volume) separator for separating the hydrogen from the catholyte, whereby the receiving container of the separator, which is connected to the pump inlet, is lower than the electrochemical reactor, such that the level of the catholyte in the receiving container of the separator, which is determined by the position of the nozzle (side tube) for the discharge of the excess catholyte from the circuit, lies below the inlet nozzle (the inlet nozzles) in the cathode compartment of the electrochemical reactor, and in the line for the discharge of the hydrogen from the capacitive (volume) separator for separation of the hydrogen from the catholyte, a cooled humidity separator is disposed, the condensate collection container of which is connected via a dosage pump with the freshwater feed to the mixing device of the freshwater flow with the gaseous oxidant mixture.

DETAILED DESCRIPTION OF THE INVENTION

Figure 1:
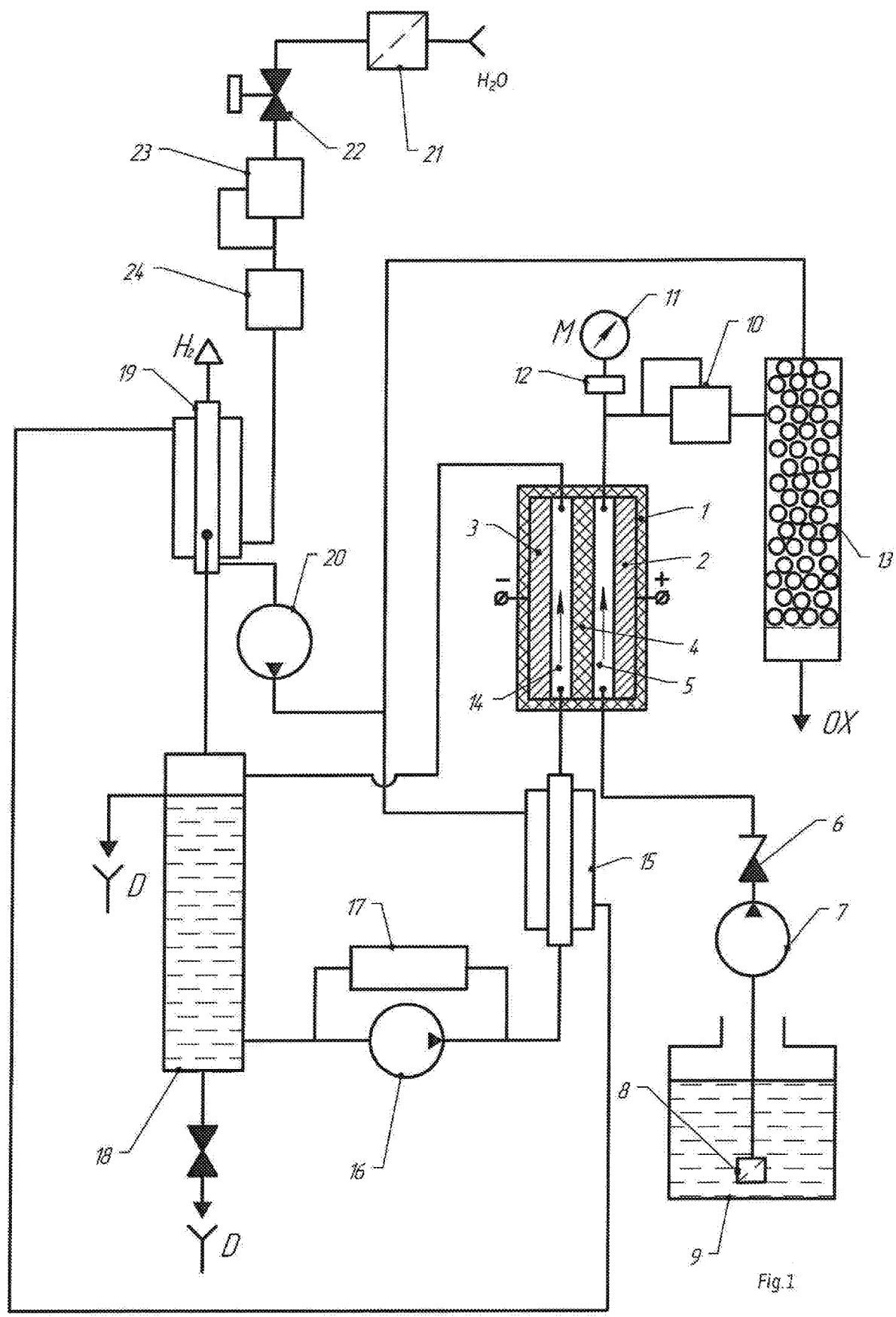
FIG. 1 shows the structure diagram of the device with reactor, the electrodes of which have no interior cooling.

The device contains the reactor 1 with coaxially disposed electrodes, the anode 2, the cathode 3 and the diaphragm 4. The process chain of the anodic synthesis of the oxidant is represented by the anode compartment 5 of the reactor 1, the entrance of which is connected via the return valve 6 with the exit of the overpressure dosage pump 7, the entrance to which is connected to the filter 8, which is immersed in a container with the initial saline solution 9.

The exit of the anode compartment 5 is connected to a stabilization pressure regulator 10 for gaseous products of the electrochemical anodic decomposition of the saline solution 9. On the feed line for the products of the anodic synthesis to the stabilization pressure regulator 10, a pressure gage 11 is installed, which is protected against chemically aggressive media by a separation element 12.

The exit of the stabilization pressure regulator 10 for the gas is connected to the entrance of a mixing device 13 for gaseous products of the anodic synthesis with the freshwater flow.

The cathode circuit of the device is formed by the cathode compartment 14, the entrance of which is connected to the exit of the catholyte from the heat exchanger 15. The entrance of the catholyte into the heat exchanger 15 is connected to the exit of a return conveyor pump 16, which is equipped with an overflow device 17 for the liquid return flow when the device 17 is shut down or brought briefly to a standstill. The entrance to the pump 16 is connected to the lower exit nozzle of the receiving container of a separator 18 for the separation of the hydrogen from the catholyte. This receiving container has a lower outlet nozzle for emptying the container, a central overflow nozzle for draining the excess catholyte, an upper nozzle for draining the hydrogen, and a nozzle for feeding the catholyte with hydrogen from the cathode compartment 14 of the electrochemical reactor 1, which is accordingly connected to the exit of the cathode compartment 14.

In the drainage line of the hydrogen, a humidity separator 19 is disposed, which is determined for the removal of the condensation water from the hydrogen, which predominantly contains free hydroxyl groups. The exit of the condensation chamber of the humidity separator 19 of the hydrogen is connected via a dosage pump 20 to the feed of the cooling water to the mixing device 13 for gaseous oxidants with the freshwater flow.

The freshwater from which the polyvalent metal ions have been removed is guided to the device at the entrance to the hydrogen-humidity separator 19 via a mechanical filter 21, an electromagnetic, normally closed, valve 22, a stabilization pressure regulator "according to the default setting" 23, and the flow controller 24. After exiting the hydrogen-humidity separator 19 the cooling water is guided to the entrance to the catholyte heat exchanger 15, and then travels from the exit of the heat exchanger 15 to the entrance to the mixing device 13 for the gaseous products of the anodic synthesis with the freshwater flow.

Figure 2:
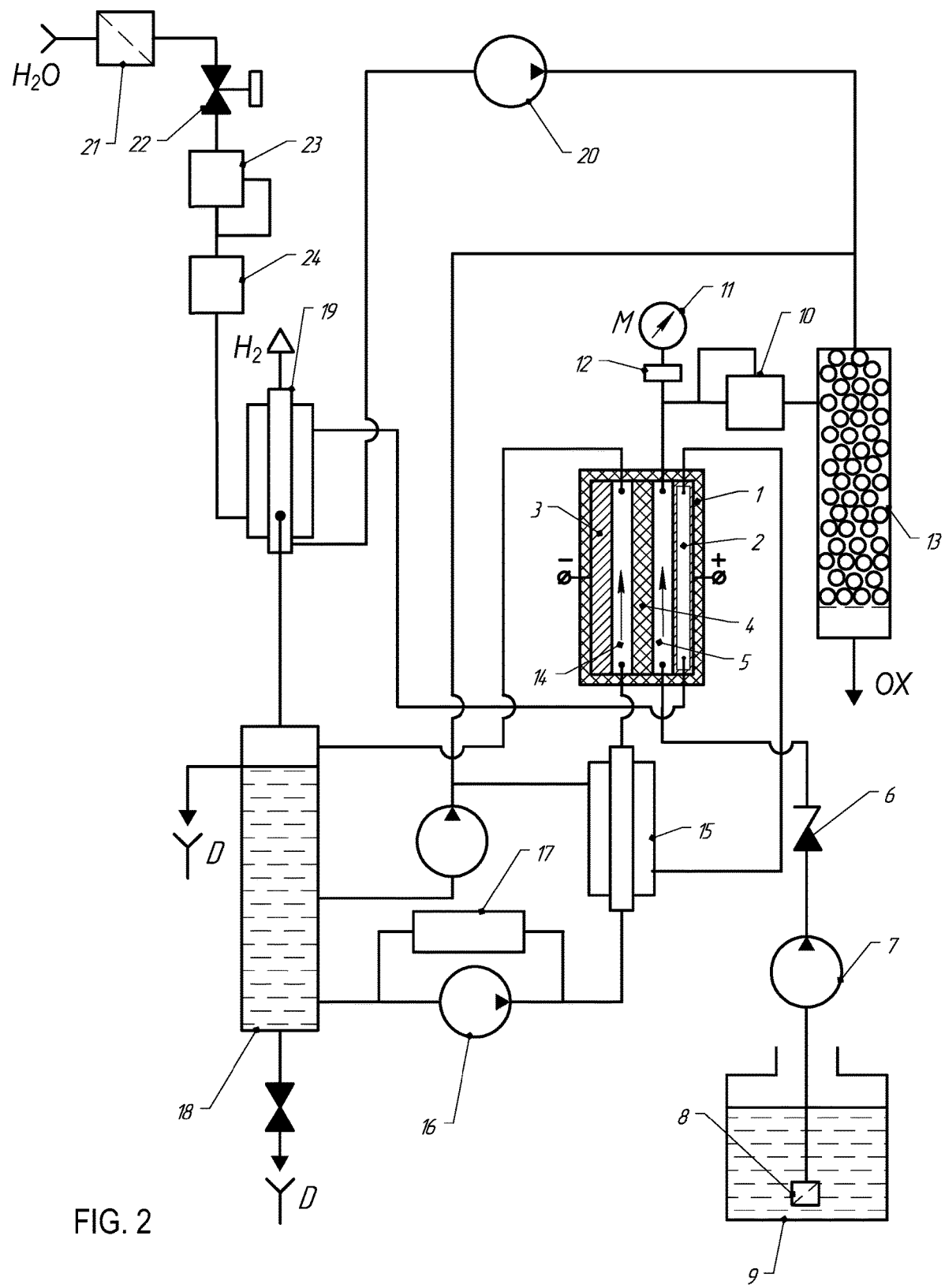
FIG. 2 shows the structure diagram of the device with reactor, which has a cooled anode that is integrated into the open heat regulation circuit of the assemblies of the device.

FIG. 2 shows an additional element of the cooling system, the cooled anode 2 of the reactor 1, which is disposed for the cooling water between the hydrogen-humidity separator 19 and the catholyte heat exchanger 15.

The device functions as follows.

The sodium chloride initial solution 9, which is produced with purified (softened) or distilled water and chemically pure salt, is filled into the container. Distilled water is filled into the receiving container of the separator 18 via the nozzle for the hydrogen draining, for the purpose of separating the hydrogen from the catholyte. This is a one-off procedure and is only required when the device is first put into operation. The following are connected: the water feed nozzle at the entrance to the mechanical filter 21 to the fresh (drinking) water pressure line. The device is switched on by applying voltage to the normally closed electromagnetic valve 22. The water flow volume through the device is regulated with a stabilization pressure regulator 23 "according to the default setting", wherein the set value is set. The water flow, which flows through the flow controller 24, triggers it and switches on the pumps 16, 20 or 7 and the current supply unit of the electrochemical reactor 1 (not shown in FIGS. 1 and 2). After filling the anode compartment 5 with saline solution, the pressure in the anode compartment 5 is regulated with the stabilization gas pressure regulator 10 "up to the default setting", wherein the set value is set and controlled by means of the pressure gage 11. During circulation in the cathode circuit, the distilled water is enriched with sodium ions, which are selected via the porous ceramic diaphragm 4 in the reactor 1 from the saline solution that fills the anode compartment 5. The volume flow of saline solution, which reaches the anode compartment 5 of the reactor 1, is selected such that at the exit of the anode compartment, only gas is obtained, which is above all represented by chlorine with a small quantity of chlorine dioxide, oxygen and ozone. This gas is saturated with water, the microdroplets of which contain hydrogen peroxide and additional metastable hydroperoxide compounds.

In the electrochemical reactor 1, the release of molecular chlorine in the anode compartment 5 and the formation of sodium hydroxide in the cathode compartment 14 is the decisive reaction:

$$NaCl+H_2O-e \rightarrow NaOH+0.5H_2+0.5Cl_2.$$

At the same time, in the anode compartment 5 with a low current yield, the synthesis reaction occurs of chlorine dioxide directly from the saline solution and from hydrochloric acid, which is formed during the dissolution of molecular chlorine close to the anode:

$$(Cl_2+H_2O \leftrightarrow HOCl+HCl):$$

$$2NaCl+6H_2O-10e \rightarrow 2ClO_2+2NaOH+5H_2;$$

$$HCl+2H_2O-5e \rightarrow ClO_2+5H.$$

In the anode compartment 5 of the reactor, ozone is form through direct decomposition of water and through oxidation of released oxygen:

$$3H_2O-6e \rightarrow O_3+6H.; 2H_2O-4e \rightarrow 4H.+O_2; \Rightarrow O_2+H_2O-2e \rightarrow O_3+2H.$$

The formation of active oxygen compounds occurs with a lower current yield:

$$H_2O-2e \rightarrow 2H.+O.; H_2O-e \rightarrow HO.+H.; 2H_2O-3e \rightarrow HO_2+3H.$$

When the gaseous product of the anodic oxidation of the sodium chloride solution is dissolved in water, a reaction usually occurs that can be expressed by the following equation:

$$Cl_2+H_2O \leftrightarrow HOCl+HCl.$$

It is known that the most important anti-microbial agent is hypochlorous acid, the quantity of which in the solution is limited by the reduced pH value that results when hydrochloric acids are formed. The pH value can be changed by adding lye, i.e. sodium hydroxide, for example. However, this leads to the formation of damaging (sodium chloride) products and products with low reactivity (sodium hypochlorite). Sodium hypochlorite is a salt of a weak acid (hypochlorous acid) and a strong alkali (sodium hydroxide), but has anti-microbial activity, which in relation to the hypochlorous acid only constitutes 1/250 to 1/350 of its activity.

$$HOCl+HCl+2NaOH \rightarrow NaOCl+NaCl+2H_2O.$$

The formation of sodium hypochlorite with simultaneous increase in the pH value with simultaneous increase in the concentration of the hypochlorous acid can be avoided by the addition of water to the reaction zone (the water contain free hydroxyl groups, which are formed during the condensation of water from the hydrogen, which is generated in the cathode compartment 14 of the electrochemical reactor 1).

The condensate from the hydrogen-humidity separator 19 is added to the water flowing through with the aid of the pump 20, which contributes to the flow of an overconcentrated, hypochlorous acid and to a significant reduction in the concentration of the sodium ions in the product obtained, the oxidant solution, which is formed in the mixer 13 when the gaseous products of the anodic synthesis are dissolved in the flowing freshwater. Here, the pH value of the product created is in the region of 5.0-6.5.

When the electrochemical system is brought to a standstill through the closure of the valve 22, the pumps 7, 16 and 20 and the current supply of the electrochemical reactor 1 switch off. Here, the catholyte flows out of the cathode compartment 14 as a result of gravity into the receiving container of the separator 18, thanks to the overflow device 17. The excess catholyte from the receiving container of the separator 18 is here discharged into the draining line through the overflow nozzle in the upper part of the receiving container (D). The anolyte remaining in the anode compartment 5 with a pH value of below 3 is filtered through the diaphragm 4 as a result of the overpressure, and in so doing, dissolves the hydroxide deposits of the polyvalent metals, which may occur in small quantities in the initial saline solution. When the device is next put into operation, all current consuming parts start working simultaneously in the previously set mode, wherein they secure a rapid stabilization of the process that lasts just a few seconds. During transportation of the device, the catholyte is drained from the receiving container of the separator 18 into the drainage line by means of outlet nozzles (D) with a valve disposed in the floor of the container.

The device was tested in comparison with the prototype, which was produced according to U.S. Pat. No. 7,897,023 B2. Both comparable devices contained an electrochemical reactor, which is represented by an electrochemical, modular element (cell) according to GB 2479286 B (electrochemical cell no. 5, Table 2). The initial saline solution contains 250 g/l of sodium chloride; the content of chlorides and calcium and magnesium sulphates in the initial solution was 0.2 mg/l. The initial solution was used during operation of the two comparable devices. The tests were conducted at a temperature of the ambient air of 20° C., a temperature of the initial saline solution of 20° C., a temperature of the drinking tap water of 15° C. and at the same temperature of the electrochemical cells of 30° C. Here, the current strength over the electrochemical reactor 1 in the prototype of the device was 6 A, with a voltage of 6 V, in the device according to the new technical solution, these were 16 A and 5 V. Accordingly, the yield of oxidants in the prototype was 6.0 g/h, and in the device according to the new technical solution, 20.5 g/h. The oxidant solution produced in the prototype at a speed of 12 l/h had an oxidant concentration of 500 mg/l with a pH value of 2.8 and a total mineral content of 0.96 g/l. Following the dosed addition of the catholyte, which is formed during the synthesis of the oxidant solution, the pH value at the exit increased to 6.0 with a simultaneous increase in the mineral content of the solution to 1.5 g/l. The oxidant solution, which is produced at a speed of 41 l/h in the device according to the new technical solution, had a pH value of 3.1 with an oxidant concentration of 500 mg/l and a total mineral content of 0.67 g/l. When the condensate was fed from the hydrogen-humidity separator 19 at the entrance to the mixing device 13, the pH value of the oxidant solution increased to 6.0, with a simultaneous increase in the mineral content to 0.72 g/l.

The time for achieving operating status following a standstill of the prototype device was 5 minutes, compared to 25 seconds for achieving operating status with the device according to the new technical solution. When cooling water was fed into the anode compartment 5 (according to the diagram in FIG. 2), the current strength over the reactor, with an unchanged temperature (30° C.) reached 20 A with a voltage of 6 V, which entailed a corresponding increase in the capacity of the device in relation to the end product, the oxidant solution, to 52 liters per hour with the above parameters.

The invention claimed is:

1. A device for producing an oxidant solution from electrolysis products of an alkali metal chloride solution, the device comprising:
    an electrochemical reactor, being represented by one or more modular electrochemical cells, which are hydraulically connected in parallel, and an anode compartment and a cathode compartment of the reactor are separated by a porous, ceramic diaphragm, which is disposed coaxially between the electrodes of the electrochemical cells;
    a device for feeding the saline solution under pressure connected with an entrance to the anode compartment;
    a device for stabilizing a specified overpressure in the anode compartment, which is connected to an exit of the anode compartment;
    a mixing device for mixing gaseous products of the anodic electrochemical reaction with freshwater, the mixing device being connected with the exit of the anode compartment downstream of the device for stabilizing a specified overpressure in the anode compartment;
    a catholyte circuit comprising the cathode compartment of the electrochemical reactor, a separator for separating hydrogen from the catholyte, a facility for draining the excess catholyte from a receiving container of the separator, and a heat exchanger for cooling the circulating catholyte; and
    a dosage pump for adding the catholyte to the mixing device for mixing gaseous products of the anodic electrochemical reaction with freshwater,
wherein
    the catholyte circuit contains a circulation pump with an overflow device for the return flow of the pump liquid, wherein the circulation pump continuously secures the forced circulation of the catholyte via the heat exchanger, the cathode compartment and the separator for separating the hydrogen from the catholyte,
    the receiving container of the separator, which is connected to a pump inlet of the circulation pump, is disposed at a lower position than the electrochemical reactor, such that the level of the catholyte in the receiving container of the separator, which is determined by the position of an overflow nozzle of the facility for draining the excess catholyte from the catholyte circuit, lies below an inlet nozzle from the cathode compartment of the electrochemical reactor,
    and, in a discharge line of the hydrogen from the separator for separation of the hydrogen from the catholyte, a cooled humidity separator comprising a condensate collection container is installed, wherein the condensate collection container is connected via the dosage pump with the freshwater feed to the mixing device for mixing gaseous products of the anodic electrochemical reaction with the freshwater.

2. The device according to claim 1, wherein the anode in the electrochemical reactor is provided with a cooling, and is disposed in an open cooling circuit of the elements of the device following the heat exchanger of the humidity separator and upstream of the heat exchanger of the catholyte in the circuit, wherein the water exiting from the cooling circuit is supplied to the mixing device for mixing the gaseous products of the anodic electrochemical reaction with the freshwater.

* * * * *